United States Patent
Smus

(10) Patent No.: US 10,075,491 B2
(45) Date of Patent: *Sep. 11, 2018

(54) DIRECTING COMMUNICATIONS USING GAZE INTERACTION

(71) Applicant: Google LLC, Mountain View, CA (US)

(72) Inventor: Boris Smus, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,978

(22) Filed: Sep. 7, 2016

(65) Prior Publication Data

US 2017/0171261 A1 Jun. 15, 2017

Related U.S. Application Data

(63) Continuation of application No. 14/965,289, filed on Dec. 10, 2015, now Pat. No. 9,451,210.

(51) Int. Cl.
*H04N 7/15* (2006.01)
*H04L 29/06* (2006.01)
*G06F 3/01* (2006.01)
*G06K 9/00* (2006.01)
*G06F 3/0481* (2013.01)

(52) U.S. Cl.
CPC ........... *H04L 65/403* (2013.01); *G06F 3/012* (2013.01); *G06F 3/013* (2013.01); *G06K 9/00335* (2013.01); *G06K 9/00617* (2013.01); *H04L 65/601* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 2010/0315482 A1* | 12/2010 | Rosenfeld | H04N 7/147 348/14.08 |
| 2012/0281059 A1 | 11/2012 | Chou | |
| 2013/0304479 A1 | 11/2013 | Teller | |
| 2014/0247321 A1 | 9/2014 | Rosenberg | |

(Continued)

OTHER PUBLICATIONS

"Eye tracking," From Wikipedia, the free encyclopedia, last modified on Dec. 9, 2015 [retrieved on Dec. 9, 2015]. Retrieved from the Internet: URL<https://en.wikipedia.org/wiki/Eye_tracking>, 8 pages.

(Continued)

*Primary Examiner* — Creighton Smith
(74) *Attorney, Agent, or Firm* — Fish & Richardson P.C.

(57) ABSTRACT

In some implementations, audio data or video data associated with a first participant of a communication session is obtained. The communication session may include communication between a first device of the first participant with a second device of a second participant of the communication session. It is determined that biometric information associated with the first participant indicates that the first participant is looking toward the first device. In response determining that the biometric information associated with the first participant indicates that the first participant is looking toward the first device, the audio data or the video data associated with the first participant is transmitted to the second device of the second participant of the communication session.

17 Claims, 8 Drawing Sheets

(56) References Cited

U.S. PATENT DOCUMENTS

| | | |
|---|---|---|
| 2014/0369506 A1 | 12/2014 | Arrasvuori |
| 2015/0055770 A1 | 2/2015 | Spittle |
| 2015/0348377 A1 | 12/2015 | Kauffmann |
| 2015/0364158 A1 | 12/2015 | Gupte |
| 2016/0014540 A1 | 1/2016 | Kelly |
| 2016/0054798 A1 | 2/2016 | Messingher |
| 2016/0093105 A1 | 3/2016 | Rimon |
| 2016/0317930 A1* | 11/2016 | Nakayama .............. G06F 3/012 |

OTHER PUBLICATIONS

"Motion capture," From Wikipedia, the free encyclopedia, last modified on Dec. 9, 2015 [retrieved on Dec. 9, 2015]. Retrieved from the Internet: URL<https://en.wikipedia.org/wiki/Motion_capture>, 11 pages.

"Videoconferencing," From Wikipedia, the free encyclopedia, last modified on Dec. 4, 2015 [retrieved on Dec. 9, 2015]. Retrieved from the Internet: URL<https://en.wikipedia.org/wiki/Videoconferencing>, 19 pages.

Balcisoy and Thalmann, "Hybrid Participant Embodiments in Networked Collaborative Virtual Environments," MMM '98. Proceedings Multimedia Modeling, pp. 130-137, Oct. 1998.

Dean et al., "Refining Personal and Social Presence in Virtual Meetings," Proceedings of the Fifteenth Australasian User Interface Conference (AUIC2014), Auckland, New Zealand, vol. 150, pp. 67-75, 2014.

Leung and Chen, "Networked Collaborative Environment with Animated 3D Avatars," 1998 IEEE Second Workshop on Multimedia Signal Processing, pp. 349-351, Dec. 1998.

Leung et al., "Networked Intelligent Collaborative Environment (NetICE)," 2000 IEEE International Conference on Multimedia and Expo, 2000. ICME 2000, vol. 3, pp. 1645-1648, 2000.

Pandzic et al., "Trends in Networked Collaborative Virtual Environments," Computer Communications 26.5, pp. 430-437, 2003.

Steptoe et al., "Eye Tracking for Avatar Eye Gaze Control During Object-Focused Multiparty Interaction in Immersive Collaborative Virtual Environments," Virtual Reality Conference, 2009. VR 2009. IEEE, pp. 83-90, Mar. 2009.

Tseng et al., "Immersive Whiteboards in a Networked Collaborative Environment," IEEE Intl. Conf. on Multimedia and Expo, 4 pages, Aug. 2001.

\* cited by examiner

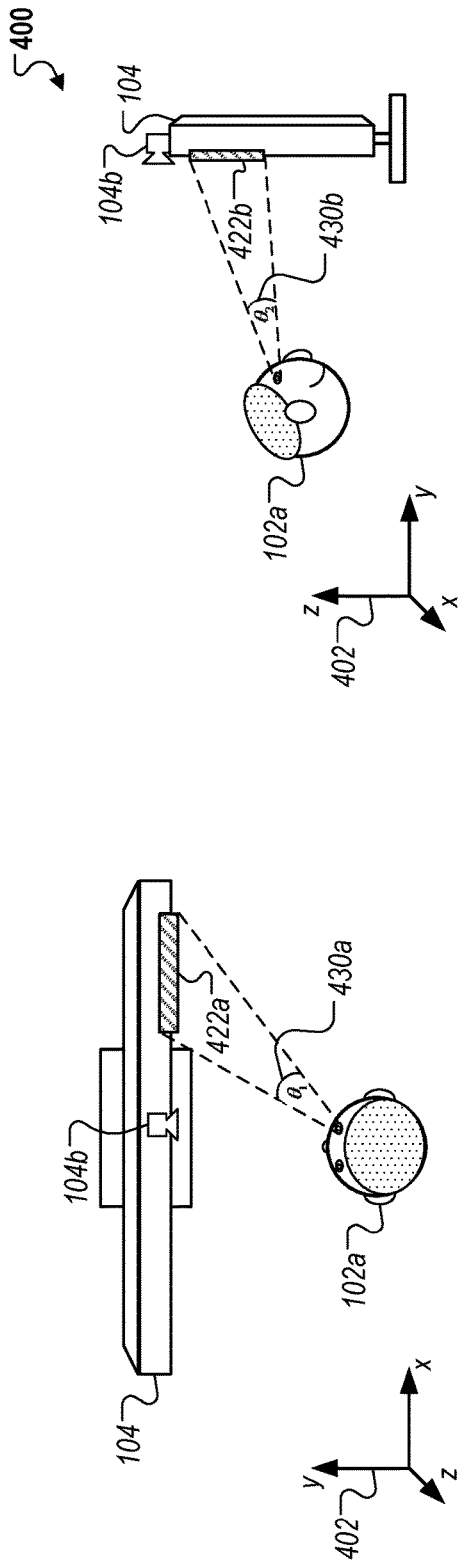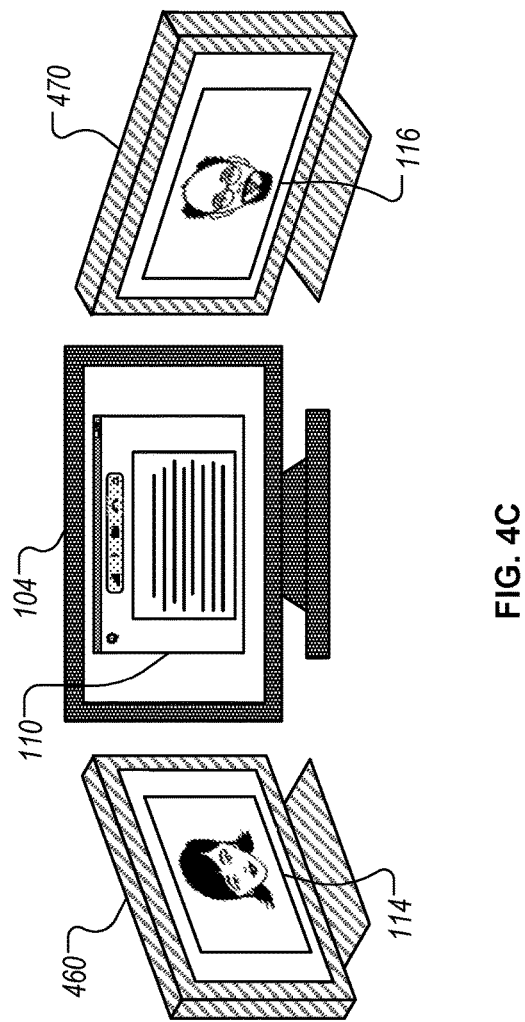
FIG. 4A
FIG. 4B
FIG. 4C

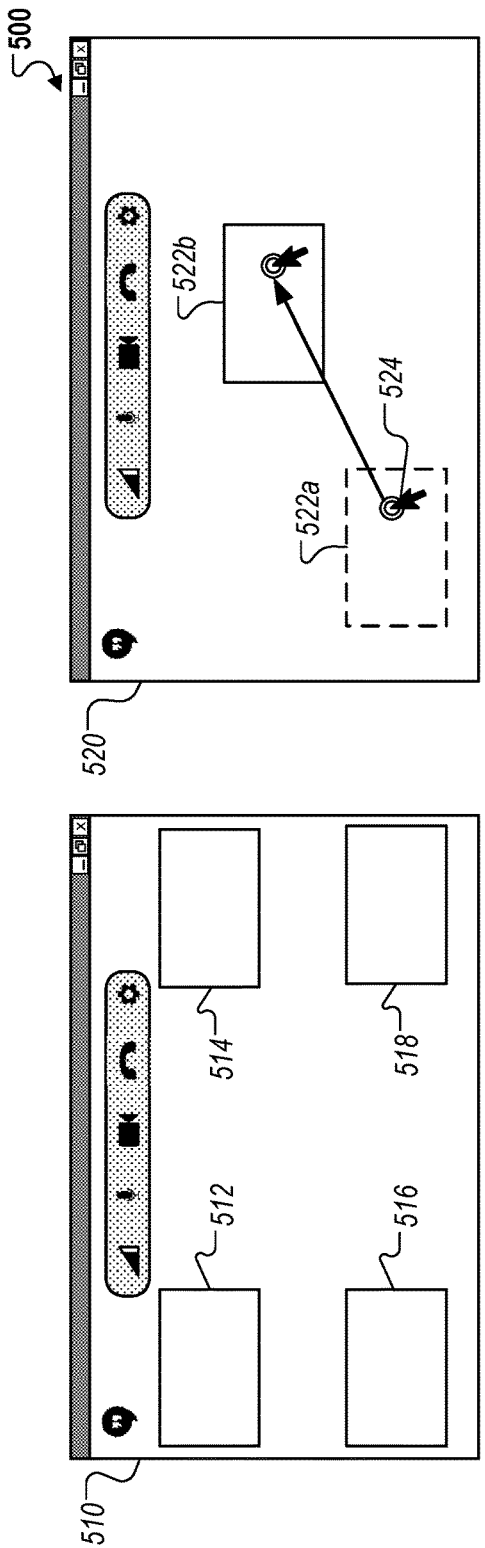
FIG. 5A
FIG. 5B
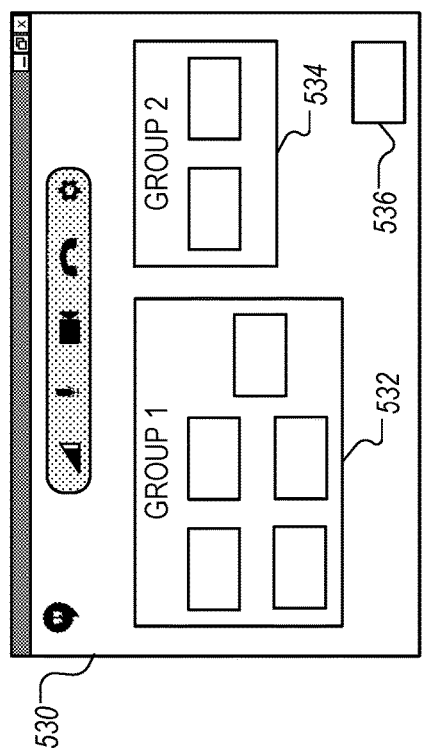
FIG. 5C

DIRECTING COMMUNICATIONS USING GAZE INTERACTION

CROSS-REFERENCE TO RELATED APPLICATION

This application is a continuation of U.S. application Ser. No. 14/965,289, filed Dec. 10, 2015, the entire contents of which are incorporated by reference herein.

FIELD

This specification generally describes electronic communications.

BACKGROUND

Electronic communication sessions enable two or more remote users to exchange data transmissions from different locations. For example, video conferences enable remote users to exchange visual information, while audio conferences enable remote users to exchange audible information. Some electronic communication sessions may include interactive features that improve the exchange of information between remote users.

SUMMARY

Individuals often use directing actions, such as providing a shoulder tap or establishing eye contact, during in-person group communication sessions in order to provide cues to other individuals that information is being directed to them. Some electronic communication sessions, such as video chats, often include remote users that all receive similar audio or video transmissions. In these sessions, communicating with only specific remote users without interrupting the flow of information to the group is often difficult. In addition, because remote users are not provided with cues that indicate whether another user may be focusing their attention towards them, it is often difficult to subtly address individual users within a group conversation.

In some implementations, gaze-based controls may be used to enhance communications by allowing a user to direct the transmission of information to individual users without interrupting a group conversation. For example, audio or video communications can be provided to only a subset of the participants in a communication session, while other participants either do not receive the communications or receive the communication in a different manner. For instance, spatial positions can be assigned to remote users and indicated on an interface that is viewable to a user during a communication session. In addition, the gaze of the user may be detected by measuring the head and eye movement of the user during the communication session. The gaze of the user may then be evaluated in order to determine whether the user is looking at a portion of the interface corresponding to a particular remote user. In response, different audio signals from the user are transmitted to each of the remote users based on the gaze of the user. In this manner, a user can easily direct a private voice or video message to a specific user or subset of users simply by looking in a particular direction, enabling more natural communication between individual users within a group communication session.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In one aspect, a computer-implemented method can include: establishing a communication session between a device of a first user and devices of at least two remote users, the communication session including at least audio communication between the first user and the at least two remote users; determining, for each of the at least two remote users, a spatial position assigned to the remote user relative to a display viewable by the first user; detecting, by the device of the first user, audio from the first user; determining a gaze direction of the first user; evaluating the gaze direction of the first user with respect to the spatial positions assigned to the at least two remote users; and based on evaluating the gaze direction with respect to the spatial positions assigned to the remote users, transmitting different audio to the devices of the at least two remote users during the communication session.

Other versions include corresponding systems, and computer programs, configured to perform the actions of the methods encoded on computer storage devices.

One or more implementations can include the following optional features. For example, in some implementations, transmitting different audio to each of the at least two remote users includes selectively transmitting the detected audio from the first user to the devices of the at least two remote users based on the evaluation.

In some implementations, transmitting different audio to the devices of the at least two remote users includes transmitting the audio from the first user such that the devices of the at least two users receive the audio from the first user at different volume levels.

In some implementations, transmitting different audio to each of the at least two remote users includes: transmitting the detected audio from the first user to the device of one of the at least two remote users based on the evaluation; and not transmitting the detected audio to devices of the other users of the at least two remote users based on the evaluation.

In some implementations, determining a gaze direction of the first user includes determining an eye position and a head position of the first user relative to the display.

In some implementations, the computer-implemented method further includes displaying, on the display viewable by the first user, a user interface element for each of the at least two remote users, the locations of the user interface elements for the at least two remote users corresponding to the spatial positions assigned to the at least two remote users.

In some implementations, evaluating the gaze direction of the first user with respect to the spatial positions assigned to the at least two remote users includes determining that the gaze of the first user is directed toward a portion of the display that includes the user interface element for a particular remote user of the at least two remote users.

In some implementations, the computer-implemented method further includes determining, for a particular remote user of the at least two remote users, a scaling factor based on a distance between the gaze direction and the user interface element for the particular remote user; and where transmitting different audio to the devices of the at least two remote users comprises transmitting, to the device of the particular remote user, detected audio from the first user having a volume scaled according to the scaling factor.

In some implementations, the computer-implemented method further includes determining that the gaze of the first user is directed away from a particular user element for a particular remote user of the at least two remote users; and based on determining that the gaze of the first user is directed away from the user element for a particular remote user of the at least two remote users, restricting transmission of audio from the first user such that audio detected from the first user while the first user is looking away from the particular user element is not transmitted to the particular remote user.

In some implementations, the user interface element for a particular remote user of the at least two remote users is a video stream of the particular remote user.

In some implementations, the communication session between the first user and the at least two remote users is a video conference.

In some implementations, the spatial position assigned to the remote user is adjustable by the first user.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIGS. 4A-4C are diagrams that illustrate example techniques for detecting a gaze direction of a user during a communication session.

FIGS. 5A-5C are diagrams that illustrate example user interface features that can be used during a communication session.

In the drawings, like reference numbers represent corresponding parts throughout.

DETAILED DESCRIPTION

Figure 1A:
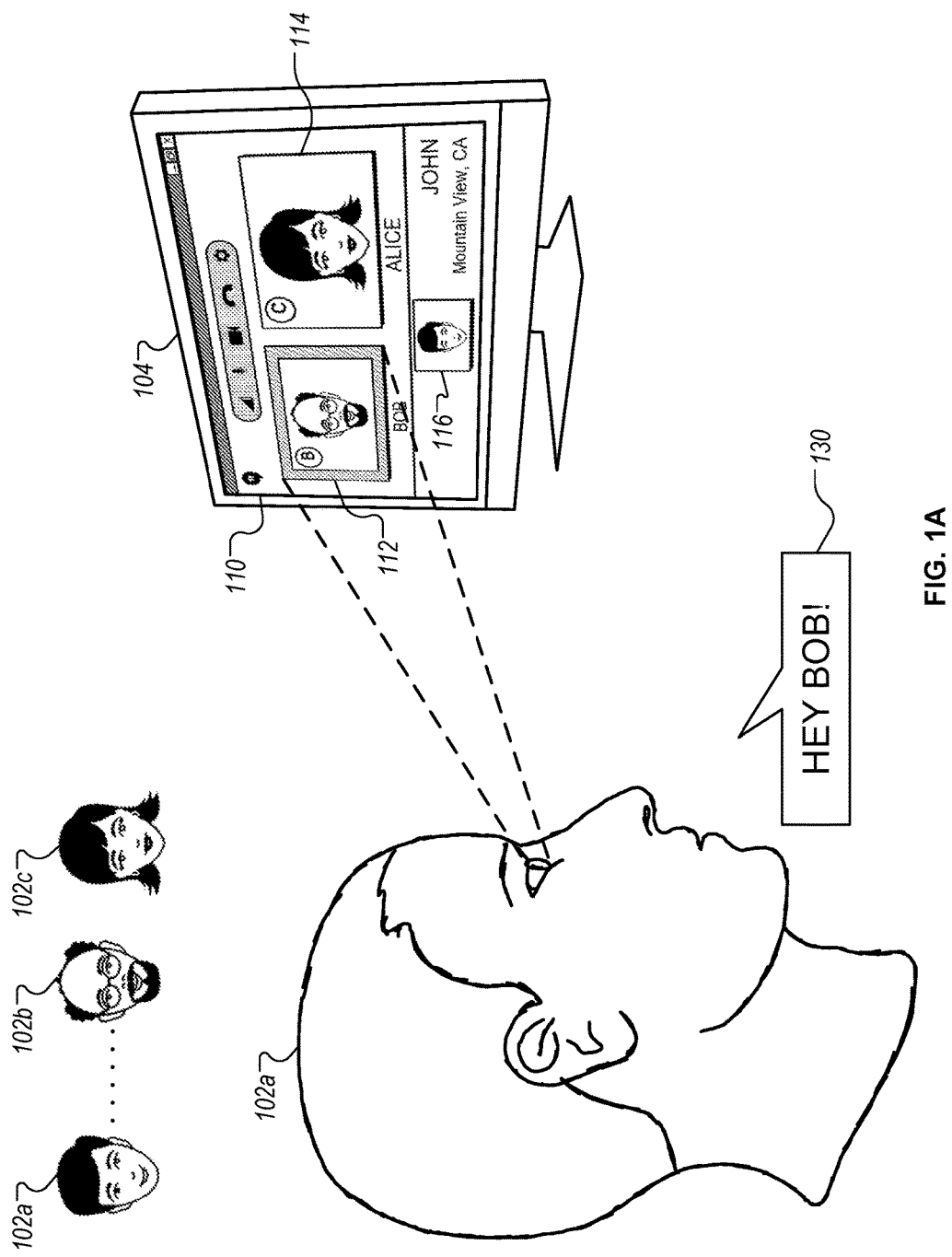
FIG. 1A is a diagram that illustrates an example of transmitting different communications to remote users based on a detected gaze direction.

FIG. 1A is a diagram that illustrates an example of transmitting different communications to remote users based on a detected gaze direction of a user. In the example, a device 104 has established a communication session between a user 102a and two remote users, users 102b and 102c. During the communication session, the device 104 can display an interface 110, which presents interface elements 112, 114, and 116 assigned to the users 102a, 102b, and 102c, respectively. The locations of the interface elements 114 and 116 are then compared to the gaze direction of the user 102a to determine if the user 102a is presently looking at the interface element 112 for user 102b or the user interface element 114 for user 102c.

The communication session can be a video conference where the user 102a and the remote users exchange video feeds. In such instances, the user interface elements 112, 114, and 116 represent video streams of the users 102a, 102b, and 102c that are exchanged using video communication software (e.g., an online group chat). For example, the interface 110 can be a user interface presented to the user 102a while using a video conference application that operates on the device 104. In other implementations, the communication session can be an audio communication session such as a telephone conference where the user 102a and the remote users exchange audio transmissions. In such implementations, the user interface elements 112, 114, and 116 can be avatars or icons representing each user that are displayed on the interface 110.

After a communication session between the users 102a, 102b, and 102c has been established, the device 104 can detect the gaze direction and the audio from the user 102a. In some instances, the gaze direction of the user 102a can be detected prior detecting audio from the user 102a, and can be used to determine which participants the user 102a intends to speak to, before the user begins speaking. For example, as depicted in FIG. 1A, the device 104 can initially determine that the gaze of the user 102a is directed to the interface element 112, and in response, transmit speech that the user 102a subsequently speaks to the device associated with the user 102b. Additionally, since the user 102a is determined to not gaze at the interface element 114, the speech of the user 102a may not be transmitted to the user 102c.

In some implementations, the interface 110 may show an indicator when a gaze of at least a minimum duration is detected for a particular user interface element. For example, after the user 102a has gazed in the direction of the user interface element 112 for at least three seconds, an indicator, such as a an icon, text, a border, shading, or a color change, may be added to demonstrate that the system recognizes that the attention of the user 102a is directed to the user 102b and not to the group as a whole. This indicator may show the user 102a that subsequent communications, e.g., while the indicator is showing, will be directed only to the indicated user 102b or will be directed in different manners to the different users 102b, 102c.

In other instances, the gaze direction of the user 102a can be detected simultaneously with the audio detection from the user 102a. For example, in these instances, the device 104 can determine an instantaneous gaze of the user 102a at the time the user 102a provides the speech 130. In response, the device 104 can transmit audio data of the speech 130 to the device of the user 102b based on determining that, at the instance when the user 102a begins the speech 130, the gaze of the user 102a is directed to the interface element 112.

The gaze direction of the user 102a is detected by a gaze interaction module associated with the device 104. For example, in some implementations, the gaze direction of the user 102a can be detected based on measuring head movement and eye movement of the user 102a, e.g., with a camera of the device 104. The gaze direction of the user 102a indicates an area on the interface 110 that represents a visual focus of the user 102a. More particular descriptions of techniques used to detect the gaze direction are included with FIGS. 4A-4B.

The gaze direction of the user 102a is evaluated based on comparing the area of the gaze on the display of the device 104 and the portion of the interface elements 112 and 114 that fall within the area of the gaze. For instance, the area of the gaze on the display of the device 104 indicates a spatially addressable visual region of the user 102a on the interface 110. For example, if the area of the gaze overlaps the entire region of the interface 110 where interface element 112 is displayed, then the device 104 can determine that the audio data of the speech 130 is specifically directed to the user 102b. Alternatively, if the area of the gaze does not overlap a region of the interface 110 where another interface element (e.g., interface element 114) is located, the device 104 can determine that the audio data speech 130 is not directed to the user 102c.

The comparison between the gaze direction of the user 102a and the spatial locations of the user elements 112 and 114 on the interface 110 can be used to differentially transmit communications of the user 102a to devices of the users 102b and 102c. In some implementations, audio can be transmitted in different magnitudes to the devices of users 102b and 102c. For example, if the gaze direction indicates that the gaze of the user 102a is more focused on the interface element 112 compared to the interface element 114, then a greater magnitude (e.g., volume) of audio signal of the speech 130 can be transmitted to the device of the user 102b compared to the audio signal transmitted to the device of the user 102c.

In some implementations, scaling factors can be used to magnify or attenuate a baseline audio of the user 102a. For instance, the scaling factors can be calculated based on the amount of overlap between the interface elements and the gaze of the user 102a. In addition, the scaling factors can then be used to weight the volume of the audio that is transmitted to each device of the users 102b and 102c.

Alternatively, in other implementations, the audio of the user 102a can be selectively transmitted to the devices of the users 102b and the user 102c such that only one of the user devices receives the audio and the other does not. For instance, in these implementations, the gaze direction of the user 102a can be used to determine which of interface elements 112 and 114 have a greater portion that falls within the area of the gaze of the user 102a. For example, if a greater portion of the interface element 114 is within the area of the gaze of the user 102a compared to the portion of the interface 114, then the audio of the user 120a is transmitted to the device of the user 102b, but not to the device of the user 102c.

Other types of communications can also be selectively or differentially transmitted based on the user's gaze and/or head position. For example, when the user 102a gazes at the interface element 112, video of the user 102a may be provided to only user 102b and a still image may be provided to user 102c. As another example, a higher quality video feed, e.g., having a higher frame rate, may be provided to a user indicated by gaze direction, while a lower quality or lower frame rate feed is provided to other users. As another example, private transmission of text messages, file transfers, or other communications may be initiated to a specific individual or a specific subset of participants in a group according to the gaze and/or head position of a user making the transmission.

In some implementations, the spatial positions of the interface elements 112, 114, and 116 on the interface 110 can be pre-configured at the start of communication session between the users 102a, 102b, and 102c. For instance, a baseline spatial configuration may initially designate where the interface elements 112, 114, and 116 will be placed when the user 102a enters the communication session. In some instances, the baseline spatial configuration can be adjustable by the user 102a prior to initiating the communication session.

Alternatively, in other implementations, the spatial positions of the interface elements 112, 114, and 116 can be adjustable throughout the communication session between the user 102a, the user 102b, and the user 102c. In such implementations, the interface elements 112, 114, and 116 can be selectable by the user 102a, and moved throughout the interface 110 with a user input by the user 102a (e.g., a click and drag motion). In some instances, the size of the interface elements 112, 114, and 116 on the interface 110 can also be adjustable by the user 102a. More particular descriptions related to the spatial positions of user interface elements associated with remote users are included with respect to FIG. 3.

Figure 1B:
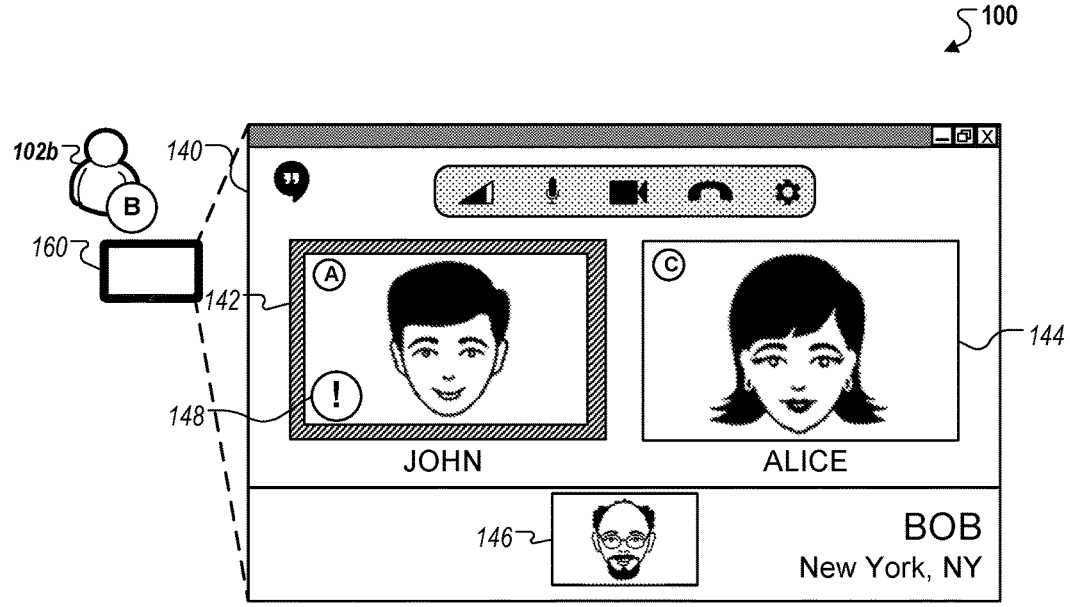
FIGS. 1B-1C are diagrams that illustrate examples of user interfaces displayed to remote users of a communication session.
Figure 1C:
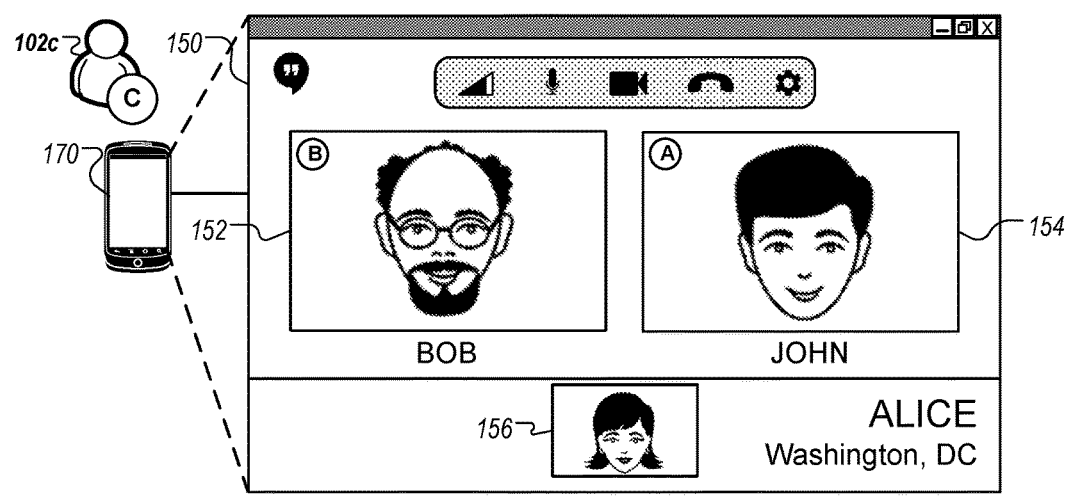

FIGS. 1B-1C are diagrams that illustrate examples of user interfaces 140 and 150 displayed to remote users 102b and 102c, respectively, during a communication session. For instance, the interfaces 140 and 150 are displayed on a device 160 of the user 102b and a device 170 of the user 102c, respectively, during the communication session depicted in FIG. 1A.

In some implementations, the device 104 or another computing device, such as a server, determines to direct communications based on a combination of signals. For example, the statement "hey Bob" from user 102a may be recognized by a speech recognition service, and the name "Bob" may be compared to names of participants in the communication session. A match with the name of user 102b may be determined to indicate that the user 102a intends to communicate with user 102b and not other users. The device 104 or another computing device may use gaze interaction information, head and body position information, speech, and other user input together to determine whether the user 102*a* intends to limit communication to a subset of the group, and if so, which users the user 102*a* intends to communicate with.

Referring to FIG. 1B, the interface 140 displays an interface element 142 assigned to the user 102*a*, an interface element 144 assigned to the user 102*c*, and the interface element 146 assigned to the user 102*b*. Referring to FIG. 1C, the interface 150 displays an interface element 152 assigned to the user 102*b*, an interface element 154 assigned to the user 102*a*, and the interface element 156 assigned to the user 102*c*.

A notification 148 may be presented on the interface 140 during the communication session. For instance, the notification 148 indicates that the gaze direction of the user 102*a* is presently directed to the interface element 112 during the communication session. In some instances, the notification 148 is presented in response to a determination by the device 104 that the gaze direction of the user 102*a* has been directed to the interface element 112 for a threshold time period (e.g., five seconds). In other instances, the notification 148 is presented in response to a determination by the device 104 that a threshold portion of the interface element 112 falls within the gaze area of the user 102*a* on the user interface 110, indicating a high likelihood that the user 102*a* is presently looking at the interface element 112 during the communication session. The presence of the notification 148 may indicate that the user 102*a* is likely to initiate a communication directed primarily to or only to the user 102*b* that is viewing the interface 140. The notification 148 may also be provided only after the user 102*a* is determined to be gazing in the direction of the interface element 112 for at least a threshold period of time, e.g., one second, three seconds, etc.

In some implementations, the notification 148 can be a sound notification provided to the user 102*b*. In other implementations, the notification 148 can additionally include a request to accept an audio transmission of the speech 130 from the user 102*a*. For instance, the notification 148 can include an option to either accept or reject the audio transmitted from the device 104 during the communication session.

In some implementations, in addition to providing the notification 148 to the user 102*b*, the interface 140 can additionally present an option to initiate a private conversation between the user 102*a* and the user 102*b*. For example, the private conversation can be a text chat box to exchange text messages between the user 102*a* and the user 102*b*. In such implementations, the private conversation can be utilized to enable the user 102*a* and the user 102*b* to exchange user-specific information without disturbing the group conversation within the communication session. As discussed herein, in some implementations, a private conversation may be established between two or more users based on eye gaze and/or head position alone, without being specified by other user inputs.

Figure 2:
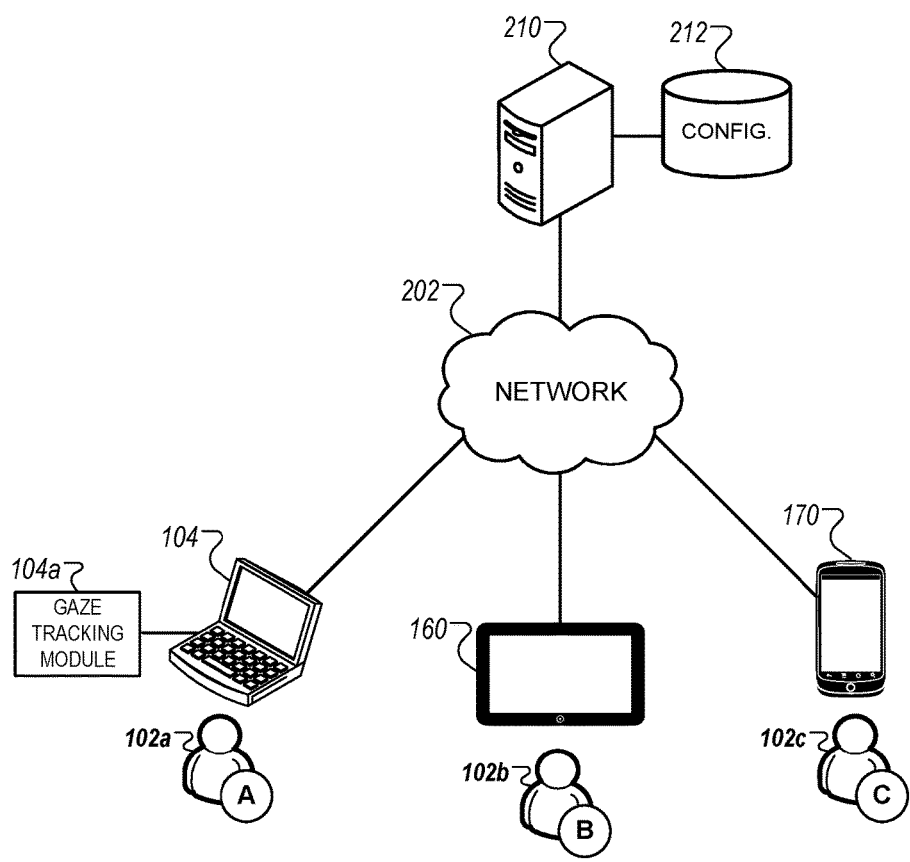
FIG. 2 is a block diagram that illustrates an example of a system for establishing communication between remote users.

FIG. 2 is a block diagram that illustrates an example of a system 200 for establishing a communication session between remote users. The system 200 includes a server 210 that stores a configuration 212 for the communication session, the device 104 of the user 102*a*, the device 160 of the user 102*b*, and the device 170 of the user 102*c*. The server 210, the device 104, the device 160, and the device 170 are connected over a network 202.

The server 210 can be a server that establishes a connection between the devices 104, 160, and 170 over the network 202 and transmits incoming and outgoing data transmissions from each of the individual devices. For example, the server 210 can receive audio or video streams from each of the devices 104, 160, and 170 and broadcast the received audio or video streams over the network 202 during a communication session between the users 102*a*, 102*b*, and 102*c*.

The server 210 can additionally store a configuration 212 that stores initial settings for the communication session for each of the devices 104, 160, and 170. For instance, the configuration 212 can specify spatial positions of the interface elements to be displayed on the interfaces 110, 140, and 150 during a communication session, user-configured settings or preferences for the communication session, and/or other types of computer-implemented instructions to perform operations associated with the communication session. In some instances, the configuration 212 can additionally specify gaze interaction settings for the device 104, which is used to determine the gaze direction of the user 102*a* during the communication session.

The devices 104, 160, and 170 can be different types of electronic computing devices that are capable of establishing a communication session over the network 202 and displaying a user interface that presents information related to the communication session. For instance, as depicted in FIG. 2, the devices 104, 160, and 170 can be different types of devices that use a shared communication platform to establish the communication session (e.g., a conference application operating on the devices).

The device 104 additionally includes a gaze interaction module 104*a* configured to measure eye positions and head movements of the user 102*a* during the communication session. In some instances, the gaze interaction module 104*a* is a software module that is installed on the operating system running on the device 104 and configured to capture video of the user 102*a* using the camera of the device 104. For example, the gaze interaction module 104*a* can exchange communications with a front-facing camera of the device 104 to access video of the user 102*a* during the communication session and utilize feature recognition techniques to identify and determine the position of the user's eyes within the video in real-time. In some instances, the gaze interaction module 104*a* can also measure the head position of the user 102*a* to accurately determine the area of the user's interest. The head position may be useful to determine a gaze direction of the user 102*a* during instances where the head direction and the eye direction of the user 102*a* are not in the same direction (e.g., when the user is directing his sight towards a peripheral view). In some instances, a user's eye position may move, but the head position may remain facing a specific direction, helping to determine or confirm the user's primary gaze direction even though the user may be looking in several different areas over a period of time.

In some implementations, the gaze interaction module 104*a* is included within a separate hardware component with dedicated cameras to detect the gaze of the user 102*a*. For instance, the gaze interaction module 104*a* can be operated on a specialized camera that is specially designed to determine eyes and head movements of a user 102*a* using specific optical detection techniques. In such instances, the hardware component may be connected to the device 104 using a connection module in order to exchange gaze interaction data of the user 102*a*. In other instances, the gaze interaction module 104*a* can use data from a set of specialized headphones that are capable of determining the orientation of the head of the user 102*a* by detecting rotation. In such instances, the head orientation data may be used to detect the gaze of the user 102*a*. In some implementations, a gaze direction may be determined when, for example, both eye position and head position are oriented in a particular direction for at least a minimum period of time.

Any of various different techniques may be used to detect where a user's interest is directed. As discussed above, image data, such as video, from a camera of the user's device 104 or from another camera can be processed to detect eye position, head position, and/or body position of the user. Measurement systems may use available light or may include a light source, such as a visible, infrared, or near-infrared source, to obtain images of a user. As another example, a user's direction of interest may be detected using an inertial measurement unit (IMU) incorporated into a set of headphones, glasses, a hat, or another wearable device in communication with the user's device 104. The IMU may measure and report head movement or other movement of the user 102a to the user's device 104, which has a gaze interaction module 104a to interpret the received data. In some implementations, the gaze interaction module 104a can be operated on a device with IMU sensors that are capable of determine head position as part of determining the gaze of the user 102a. Accordingly, a user may use a specialized headset that provides directed audio communication based on the determined gaze of the user 102a. A wearable device, such as a head set, may optionally include a camera or other sensor for detecting eye position, in addition to an IMU. As another example, directional microphones may be used to determine a direction that the user 102a is facing. The relative intensity, delay, or other characteristics of speech detected by multiple different microphones, e.g., a microphone array, may be analyzed to determine a position of the user's head and thus where the user's attention is likely directed. Similarly, variations in the signal from a single microphone may be assessed to detect the position of a user, e.g., to determine when the user has turned toward or away from the microphone.

In some implementations, one or more of the devices 160 and 170 can also include gaze interaction modules. For instance, the system 200 can be capable of establishing a communication session between the users 102a, 102b, and 102c such that the server 210 receives audio transmissions and gaze interaction data from multiple devices. In such implementations, audio received from the individual devices of system 200 can be individually processed based on receiving gaze interaction information received from multiple devices.

The system 200 can be used in various applications where a communication session is established between remote users. For instance, in one example, the system 200 can be used to create a remote collaboration environment where individual co-workers who are positioned in a specific configuration relative to one another during reoccurring communication sessions (e.g., weekly meetings). In this example, the system 200 can be used to establish a virtual shared workplace where co-workers engage in long-term communication sessions that include activities between a subset of co-workers (e.g., designated individual activities) and group activities between all co-workers (e.g., team meetings).

In another example, the system 200 can be used for communication sessions between multiple users that speak different languages and an interpreter that provides live translations to particular users that are unable to language of an incoming audio transmission. In this example, the interpreter may receive audio signal from a first user that is placed on the left side of the translator's user interface. The interpreter may then provide a simultaneous interpretation of the first user's speech to a second user that is placed on the right side of the interpreter's user interface. The interpreter may direct his/her gaze to the right side to provide the translation only to the second user without interrupting the ongoing speech of the first user.

Figure 3:
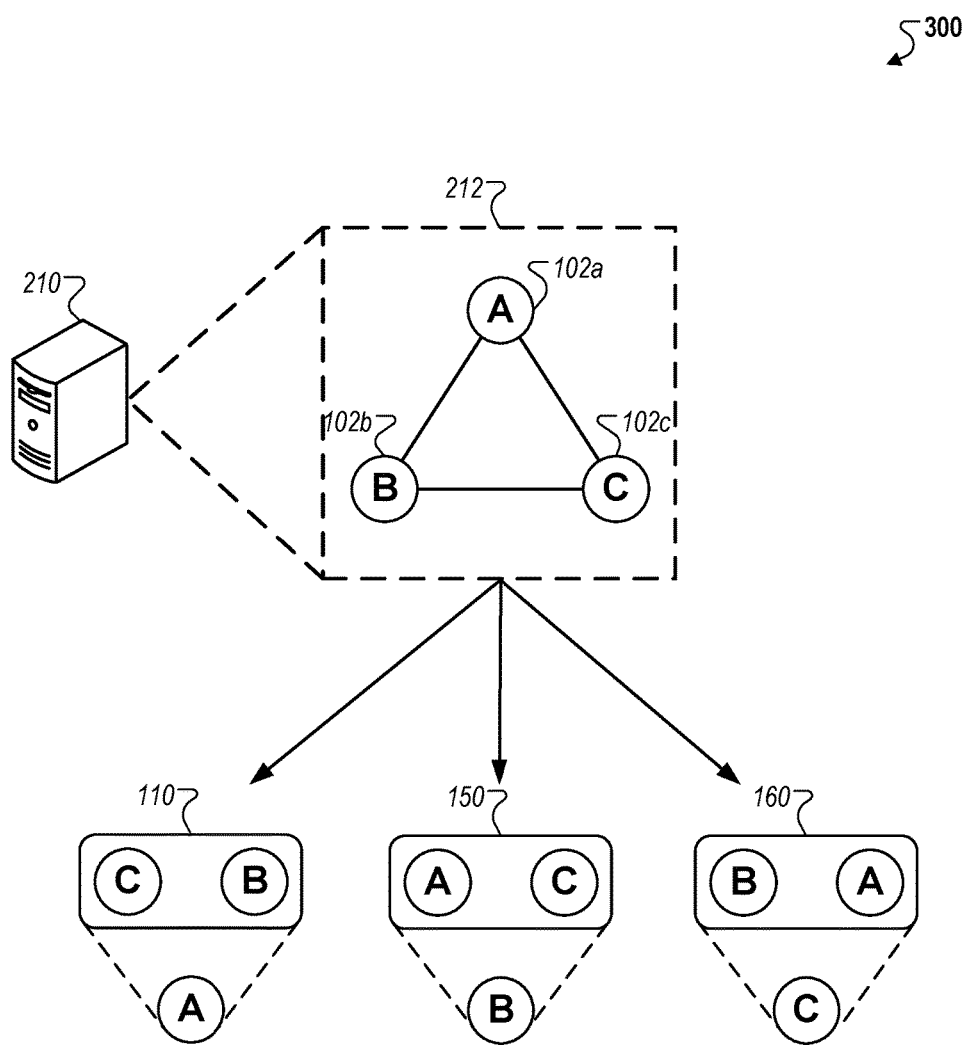
FIG. 3 is a diagram that illustrates examples of spatial orientations of remote users during a communication session.

FIG. 3 is a diagram that illustrates examples of spatial orientations of interface elements that are displayed to the users 102a, 102b, and 102c during a communication session. As depicted, the configuration 212 specifies a spatial orientation pattern between the users 102a, 102b, and 102c. The spatial orientation pattern is then individually represented from the perspective of each user using a set of spatial orientations 110a, 150a, and 160a.

The spatial orientations 110a, 150a, and 160a represent the arrangement of interface elements on the interfaces 110, 150, and 160, respectively. For instance, each spatial orientation designates the positions of interface elements corresponding to each user during a communication session. As shown in the example in FIG. 3, the configuration 212 includes a triangular arrangement between the users 102a, 102b, and 102c, which is then used to generate spatial orientations for individual user interfaces displayed to each user.

In some implementations, the spatial orientation patterns specified by the configuration 212 can be adjusted based on the relationship between users during a communication session. For example, if a particular user is a presenter or a communication host, the spatial orientation pattern specified by the configuration 212 can be oriented such that the particular user is central to the spatial orientation pattern. In another example, if the communication session includes multiple users groups with multiple users, the spatial orientation pattern can additionally include sub-patterns for each individual group in addition to an overall pattern that represents the relationship between each group.

In some implementations, the spatial orientation patterns specified by the configuration 212 can be adjusted prior to each communication session. For instance, as described in FIG. 2, in instances where the spatial positions of the interface elements viewable to a user is adjustable, prior to establishing a connection between the users, the server 210 can update the configuration 212 such that the spatial orientation pattern communication reflects the present settings of the users. For example, if the user 102a switches the positions of the interface elements 114 and 116 during a prior communication session, the server can update the spatial orientation pattern specified within the spatial orientation pattern and present an interface reflecting the spatial positions of the interface elements 114 and 116 to the user 102a.

Output at the device 104 can be provided based on the defined spatial arrangement. For example, spatial audio can be provided, with audio from user 102b being provided from the left speaker, and audio from user 102c being provided from the right speaker to enhance the sense that the user 102a has of the orientation.

In instances where the spatial orientation patterns are adjustable, the configuration 212 can specify different spatial orientation patterns for each user. For instance, in the example provided in the previous paragraph, an adjustment to the spatial positions of the interface elements 114 and 116 by the user 102a can generate a new spatial orientation pattern for the user 102a, whereas the previous spatial orientation pattern as depicted in FIG. 3 can be utilized for generating the user interfaces that are viewable to the user 102b and the user 102c. In this regard, the configuration 212 can be used to display specific user-selected arrangements of user interface elements without adjusting global spatial relationships between users.

FIGS. 4A-4C are diagrams that illustrate example techniques for detecting a gaze direction of a user during a communication session. For instance, FIG. 4A depicts a top view of a gaze direction of the user 102a, FIG. 4B depicts a side view of the gaze direction of the user 102a, and FIG. 4C depicts an example of a device arrangement used to detect the gaze direction of the user 102a.

Referring to FIGS. 4A and 4B, the horizontal and vertical projections of the gaze direction the user 102a are depicted along the x-axis and z-axis of an axis 402, respectively. As depicted, a camera 104a associated with the device 104 can collect video of the user 102a. The collected video can then be used detect gaze angles 430a and 430b, which represent angles of projection on the screen of the device 104 corresponding to the horizontal gaze area 422a and the vertical gaze area 422b.

The gaze area on the screen of the device 104 represents a region on the screen of the display 104 that indicates where the user is presently looking. The central point of the gaze area (e.g., central point calculated based on the horizontal projection 422a and vertical projection 422b) represents a point on the display of the device 104 with greatest likelihood that the user 102a is presently looking at. For instance, an associated probability score for each coordinate within the gaze area can be calculated based on a likelihood that the coordinate within the gaze area is a region that the user 102a is presently looking at. In some instances, the associated probability scores can be calculated based on an initial user alignment configuration process where the user 102a provides user inputs to identify boundary coordinates for the gaze area. In this regard, the gaze area detection can be made user-specific and responsive to individual usage patterns.

The gaze angles 430a and 430b are determined based on various factors such as, for example, the perpendicular displacement between the screen of the display 104a and the head of the user 102a, the respective coordinate positions of the head of the user 102a along the axis 402, and a prediction of a field of view of the user 102a based on detecting eye locations relative to the screen of the device 104. For example, as the perpendicular displacement between the screen of the display 104a and the head of the user 102a increases, the gaze angles 430a and 430b can be increased to reflect a greater portion of the screen of the device 104 falling within the field of view of the user 102a. In another example, if the user 102a is placed on an angle from the screen of the device 104 (e.g., towards the right side of the screen), the gaze angles 430a and 430b can be adjusted to reflect an angular projection on the screen of the device 104.

In some instances, a three-dimensional eye model can additionally be used to predict the gaze direction of the user 102a. For example, the three-dimensional eye model can be a three dimensional optical structure of the human eye that is used as a parameterized model to predict the projections of the gaze onto the display of the device 104.

As described previously with respect to FIGS. 1A and 1B, the horizontal gaze area 422a and vertical gaze area 422b can be used to determine whether the user 102a is presently looking at or in the direction of a particular interface element (e.g., interface elements 112, and 114) associated with a remote user during a communication session. For instance, the horizontal gaze area 422a and the vertical gaze area 422b can be constantly monitored during the communication session such that when the spatial position of the particular interface element falls within the gaze area, the device 104 can determine that the user 102a is presently looking at the particular interface element.

Whenever gaze direction is determined, the system may use angle thresholds to determine whether a user is selected for a communication, without requiring the user to look specifically at the user interface element for the user. For example, the user 102a may be considered to have an area of interest that is ten degrees or twenty degrees about the central axis of the user's field of view. If the spatial position for another user is determined to fall within the angular range of this area of interest, the user 102a may be determined to be gazing in a direction of that user. Similarly, head position and body position may indicate interest or focus in a particular direction, e.g., by the face or body being oriented within a threshold amount from perpendicular to the spatial direction, which may be used to determine or confirm a gaze direction.

Referring now to FIG. 4C, an example of a device arrangement used to detect the gaze direction of the user 102a is depicted. In this example, instead of displaying interface elements associated with multiple remote users on a single screen of the device 104, multiple devices can be used to display interface elements to the user 102a. For instance, a device 460 can be used to display the interface element 114 associated with the user 102b and a device 470 can be used to display the interface element 116 associated with the user 102c.

In the example shown in FIG. 4C, the devices 104, 460, and 470 can all be equipped with gaze detection modules such that the detection of the gaze direction techniques, as described with respect to FIG. 1A and FIGS. 4A-4B, can be used to determine whether the user is presently looking at one of multiple displays. In such examples, the interface 110 can display information related to the communication session (e.g., a text box for written correspondence between participants) while separate interfaces can be displayed for each user.

FIGS. 5A-5C are diagrams that illustrate example user interface features that can be used during a communication session. For instance, FIG. 5A illustrates an example layout of user interface elements on a communication interface, FIG. 5B illustrates examples of movable user interface elements with adjustable spatial positions, and FIG. 5C illustrates an example layout for a communication session between groups of multiple users.

Referring to FIG. 5A, an exemplary interface 510 includes interface elements 512, 514, 516, and 518 arranged near the corners of the interface. The interface elements 512, 514, 516, and 518 can each be associated with different remote users and used to determine whether the gaze direction of the user that views the interface 510 indicates that the user is directing the gaze to one of the interface elements 512, 514, 516, 518. Although FIG. 5A depicts the interface elements 512, 514, 516, and 518 placed near the corners of the interface 510, in some implementations, the interface elements 512, 514, 516, and 518 can be placed in alternative arrangements.

Referring now to FIG. 5B, an exemplary interface 520 includes an interface element with an adjustable position. The interface element can be moved from an initial position 522a to an adjusted position 522b with the use of a user input 524. For example, the user input 524 can be a select and drag motion using a "click" of a mouse cursor on the interface 520. In other example where the interface 520 is displayed on a touchscreen, the user input 524 can be a touch input from a user.

Referring now to FIG. 5C, an exemplary interface 530 includes user groups 532 and 534, and an interface element 536 for a single user. The user groups 532 and 534 can include multiple users that each participate in a communication session. For example, the user groups 532 and 534 can represent separate company employees during a business conference. In some implementations, each user may define subgroups of participates of a communication session, and assign different spatial locations to each subgroup. These groups may be dynamically defined or changed, by the user or by the system, before or during a communication session. Thus a user may direct private messages to different subgroups of participants at different times.

In some implementations, the gaze detection techniques as described previously, can be used on the interface 530 to transmit different audio to individual user groups such as the user group 532 or the user group 534. In such implementations, the interface 530 can include interface elements for each group that are used to determine whether the gaze of a user coincides with a portion of the user element for each group. For example, in response to determining that the gaze of a user is directed to a group interface element, audio can be selectively transmitted to each individual user that is included within the group. In this regard, the interface 530 can be used in larger conferences to transmit different audio signals to various groups.

Figure 6:
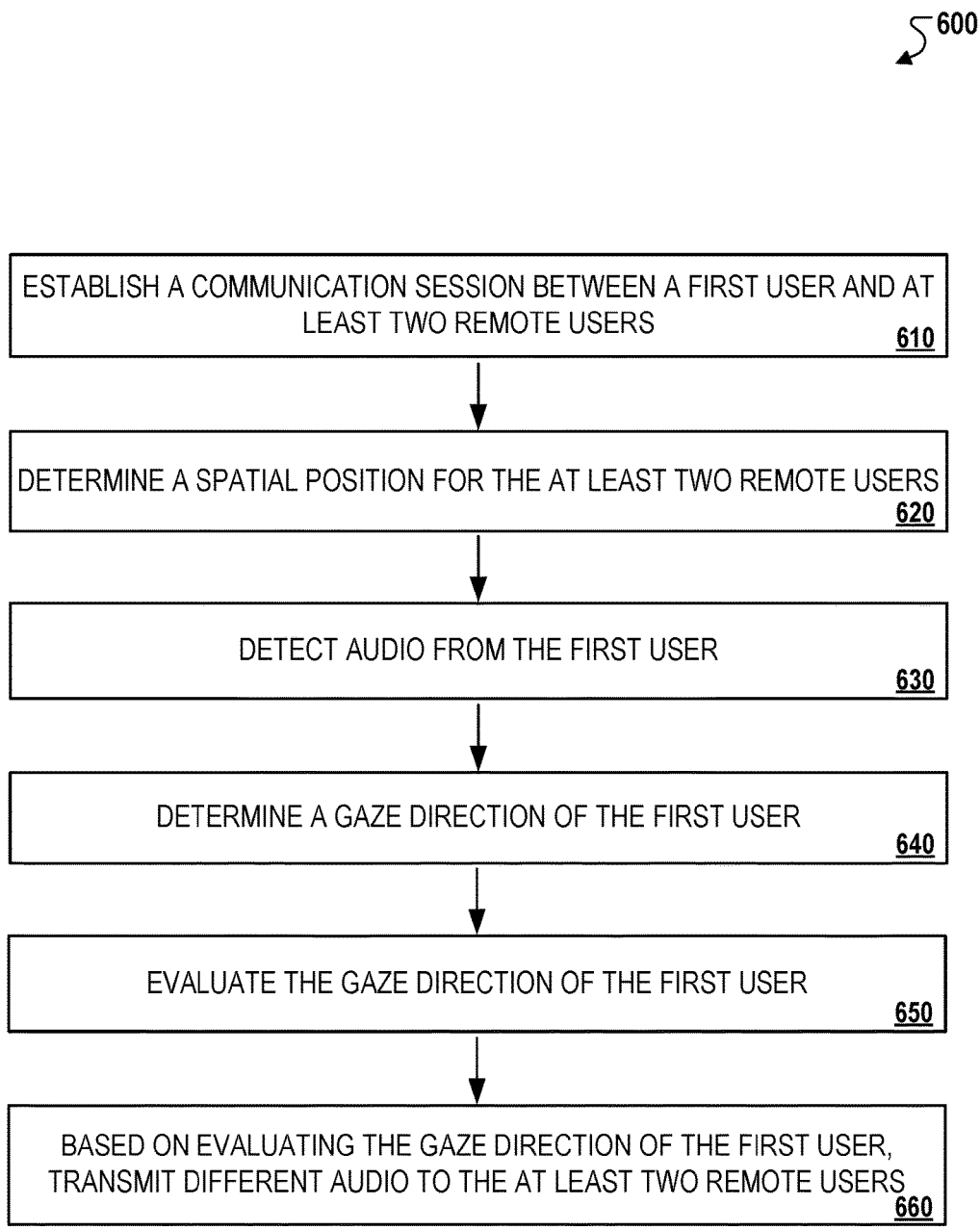
FIG. 6 is a flow diagram that illustrates an example of a process for transmitting different communications to remote users based on a detected gaze direction.

FIG. 6 is a flow diagram that illustrates an example of a process 600 for transmitting different audio to remote users based on a detected gaze direction. Briefly, the process 600 can include establishing a communication session between a first user and at least two remote users (610), determining a special position of the at least two remote users (620), detecting audio from the first user (630), determining a gaze direction of the first user (640), evaluating the gaze direction of the first user (650), and based on evaluating the gaze direction of the first user, transmitting different audio to the at least two remote users (660).

In more detail, the process 600 can include establishing a communication session between a first user and at least two remote users (610). For instance, the system 200 can establish a communication session between the device 104 of the user 102a, the device 160 of the user 102b, and the device 170 of the user 102c. The communication session can include audio communication between the user 102a, the user 102b, and the user 102c.

In some instances, the communication session between the users 102a, 102b, and 102c may be an audio conference where audio streams are transmitted between each user during the communication. Alternatively, in other instances, the communication session may be a video conference where video streams are transmitted between each user during the communication session.

The process 600 can include determining a special position of the at least two remote users (620). For instance, the system 200 can determine, for each of the user 102b and the user 102c, a spatial position assigned to the user relative to a display viewable to the user 102a.

In some implementations, the spatial position corresponds to an interface element (e.g., the interface elements 112, 114, and 116) for each user that participates in the communication session. In such implementations, the user interface elements may be a video stream of each user, or an icon/avatar associated with each user.

In some implementations, the spatial positions of the remote users may be pre-configured by the configuration 212 on the server 210 prior to establishing the communication session. Alternatively, in other implementations, the spatial positions may be adjustable such that a user can provide user inputs to reconfigure the initial spatial positions during the communication session. In these implementations, the user may additionally have the option to save the updated spatial configuration, which can then be used in a subsequent communication session with the same remote users.

The process 600 can include detecting audio from the first user (630). For instance, the device 104 can detect audio from the user 102a during a communication session.

The process 600 can include determining a gaze direction of the first user (640). For instance, the device 104 can determine a gaze direction of the user 102a. In some implementations, the gaze direction may be determined by the gaze interaction module 104a associated with the device 104. In such implementations, the gaze interaction module 104a may either be a software module operating on the device 104 that is configured to utilize the camera of the device 104, or a separate device that collects gaze interaction data and transmits the collected gaze interaction data to the device 104.

As described previously with respect to FIGS. 4A-4B, the gaze direction of the user 102a can be determined based on estimating the gaze angle, and a corresponding horizontal gaze area 422a and vertical gaze area 422b on the display of the device 104. The gaze direction of the user 102a may then be determined based on the gaze area projected onto the display of the device 104.

The process 600 can include evaluating the gaze direction of the first user (650). For instance, the gaze interaction module 104a can evaluate the gaze direction of the user 102a with respect to the spatial positions assigned to the user 102b and the user 102c. The gaze interaction module 104a can monitor the gaze area of the user 102a throughout the communication session and determine whether portions of the interface elements 112 and 114 fall within the gaze area of the user 102a. In some instances, in response to determining that a portion of a particular interface element is within the gaze area of the user 102a, the gaze interaction module 104a may determine that the user 102a is presently looking at the remote user associated with the particular interface element.

The process 600 can include, based on evaluating the gaze direction of the first user, transmitting different audio to the at least two remote users (660). For instance, based on evaluating the gaze direction of the user 102a, the device 104 can transmit different audio to the device 160 and the device 170 during the communication session.

In some implementations, if the gaze direction of the user 102a indicates that the user 102a is looking at the interface element 112, the device 104 may selectively transmit audio of the user 102a to the device of the user 102b, and not transmit audio to the device of the user 102c. In such implementations, the selective audio transmission may be used to only transmit audio to users that the gaze interaction module 104a predicts that the user 102a is presently looking at.

Alternatively, in other implementations, the device 104 may transmit audio of different magnitudes (e.g., different volumes) to the device of the user 102b and the device of the user 102c based on sizes of the portions of the user element 114 and the user element 116 that are within the gaze area of the user 102a. For example, in some instances, scaling factors that are correlated with the overlapping area between each individual interface element and the gaze area of the user 102a may be used to weight the magnitude of the audio that is transmitted to the corresponding devices of the remote users.

Figure 7:
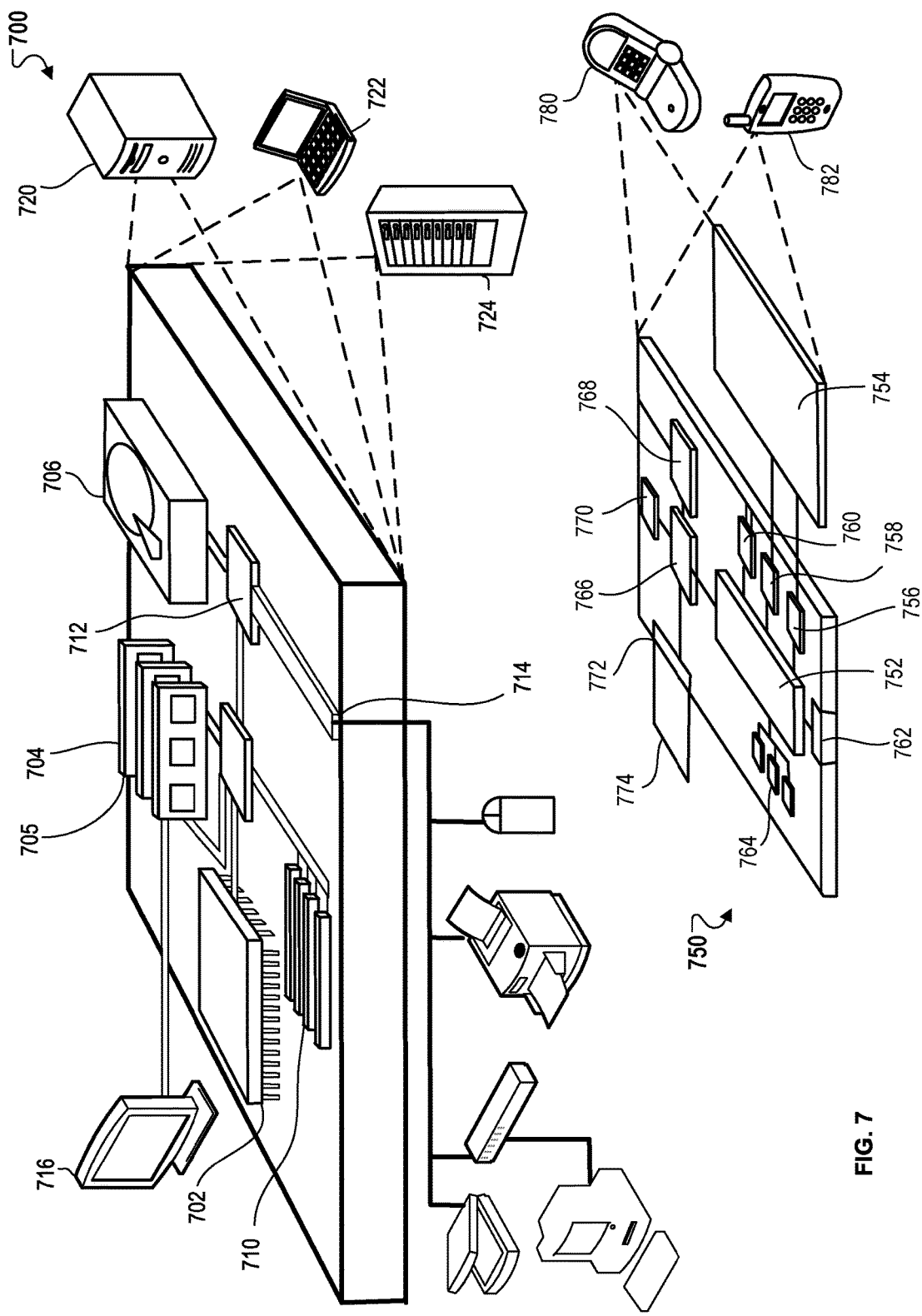
FIG. 7 is a block diagram of computing devices on which the processes described herein, or portions thereof, can be implemented.

FIG. 7 is a block diagram of computing devices 700, 750 that can be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses can be used, as appropriate, along with multiple memories and types of memory. Also, multiple computing devices 700 can be connected, with each device providing portions of the necessary operations, e.g., as a server bank, a group of blade servers, or a multi-processor system.

The memory 704 stores information within the computing device 700. In one implementation, the memory 704 is a volatile memory unit or units. In another implementation, the memory 704 is a non-volatile memory unit or units. The memory 704 can also be another form of computer-readable medium, such as a magnetic or optical disk.

The storage device 706 is capable of providing mass storage for the computing device 700. In one implementation, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth intensive operations. Such allocation of functions is exemplary only. In one implementation, the high-speed controller 708 is coupled to memory 704, display 716, e.g., through a graphics processor or accelerator, and to high-speed expansion ports 710, which can accept various expansion cards (not shown). In the implementation, low-speed controller 712 is coupled to storage device 706 and low-speed expansion port 714. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices can contain one or more of computing device 700, 750, and an entire system can be made up of multiple computing devices 700, 750 communicating with each other.

The computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices can contain one or more of computing device 700, 750, and an entire system can be made up of multiple computing devices 700, 750 communicating with each other.

Computing device 750 includes a processor 752, memory 764, and an input/output device such as a display 754, a communication interface 766, and a transceiver 768, among other components. The device 750 can also be provided with a storage device, such as a microdrive or other device, to provide additional storage. Each of the components 750, 752, 764, 754, 766, and 768, are interconnected using various buses, and several of the components can be mounted on a common motherboard or in other manners as appropriate.

The processor 752 can execute instructions within the computing device 750, including instructions stored in the memory 764. The processor can be implemented as a chipset of chips that include separate and multiple analog and digital processors. Additionally, the processor can be implemented using any of a number of architectures. For example, the processor 710 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 750, such as control of user interfaces, applications run by device 750, and wireless communication by device 750.

Processor 752 can communicate with a user through control interface 758 and display interface 756 coupled to a display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can be provide in communication with processor 752, so as to enable near area communication of device 750 with other devices. External interface 762 can provide, for example, for wired communication in some implementations, or for wireless communication in other implementations, and multiple interfaces can also be used.

The memory 764 stores information within the computing device 750. The memory 764 can be implemented as one or more of a computer-readable medium or media, a volatile memory unit or units, or a non-volatile memory unit or units. Expansion memory 774 can also be provided and connected to device 750 through expansion interface 772, which can include, for example, a SIMM (Single In Line Memory Module) card interface. Such expansion memory 774 can provide extra storage space for device 750, or can also store applications or other information for device 750. Specifically, expansion memory 774 can include instructions to carry out or supplement the processes described above, and can include secure information also. Thus, for example, expansion memory 774 can be provide as a security module for device 750, and can be programmed with instructions that permit secure use of device 750. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that can be received, for example, over transceiver 768 or external interface 762.

Device 750 can communicate wirelessly through communication interface 766, which can include digital signal processing circuitry where necessary. Communication interface 766 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 768. In addition, short-range communication can occur, such as using a Bluetooth, WiFi, or other such transceiver (not shown). In addition, GPS (Global Positioning System) receiver module 770 can provide additional navigation- and location-related wireless data to device 750, which can be used as appropriate by applications running on device 750.

Device 750 can also communicate audibly using audio codec 760, which can receive spoken information from a user and convert it to usable digital information. Audio codec 760 can likewise generate audible sound for a user, such as through a speaker, e.g., in a handset of device 750. Such sound can include sound from voice telephone calls, can include recorded sound, e.g., voice messages, music files, etc. and can also include sound generated by applications operating on device 750.

The computing device 750 can be implemented in a number of different forms, as shown in the figure. For example, it can be implemented as a cellular telephone 480. It can also be implemented as part of a smartphone 782, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more electronic devices, the method comprising:
   obtaining audio data or video data associated with a first participant of a communication session, wherein the communication session includes communication between a first device of the first participant with a second device of a second participant of the communication session;
   muting audio of the first participant such that the audio of the first participant is not transmitted to the second device of the second participant;
   after muting the audio of the first participant, determining that biometric information associated with the first participant indicates that the first participant is looking toward the first device; and
   in response determining that the biometric information associated with the first participant indicates that the first participant is looking toward the first device, unmuting the audio of the first participant such that the audio of the first participant is transmitted to the second device of the second participant.

2. The method of claim 1, wherein the biometric information comprises eye tracking data for the first participant.

3. The method of claim 1, wherein the biometric information comprises head position data for the first participant.

4. The method of claim 1, wherein the communication session includes communication with a third device of a third participant of the communication session; and
   wherein determining that biometric information associated with the first participant indicates that the first participant is looking toward the first device comprises determining a direction of gaze of the first participant during the communication session;
   wherein the method comprises selecting, from among the participants of the communication session, the second participant based on the direction of the gaze of the first participant; and
   wherein the method further comprises transmitting the audio data or the video data associated with the first participant to the second device of the second participant of the communication session based at least on selecting the second participant from among the participants of the communication session.

5. The method of claim 4, further comprising:
   providing, for display at the device of the first participant, an indicator that indicates the selected participant.

6. The method of claim 4, wherein:
   the second participant has an assigned direction relative to the first participant; and
   determining that biometric information associated with the first participant indicates that the first participant is looking toward the first device comprises determining that the first participant is looking toward the assigned direction corresponding to the second participant.

7. A system comprising:
   one or more electronic devices; and
   one or more non-transitory machine-readable media coupled to the one or more electronic devices, the one or more non-transitory machine-readable media having instructions stored thereon, which, when executed by the one or more electronic devices, cause the one or more electronic devices to perform operations comprising:
      obtaining audio data or video data associated with a first participant of a communication session, wherein the communication session includes communication between a first device of the first participant with a second device of a second participant of the communication session;
      muting audio of the first participant such that the audio of the first participant is not transmitted to the second device of the second participant,
      after muting the audio of the first participant, determining that biometric information associated with the first participant indicates that the first participant is looking toward the first device; and
      in response determining that the biometric information associated with the first participant indicates that the first participant is looking toward the first device, unmuting the audio of the first participant such that the audio of the first participant is transmitted to the second device of the second participant.

8. The system of claim 7, wherein the biometric information comprises eye tracking data for the first participant.

9. The system of claim 7, wherein the biometric information comprises head position data for the first participant.

10. The system of claim 7, wherein the communication session includes communication with a third device of a third participant of the communication session;
    wherein determining that biometric information associated with the first participant indicates that the first participant is looking toward the first device comprises determining a direction of gaze of the first participant during the communication session;
    wherein the operations comprise selecting, from among the participants of the communication session, the second participant based on the direction of the gaze of the first participant; and
    wherein the operations further comprise transmitting the audio data or the video data associated with the first participant to the second device of the second participant of the communication session based at least on selecting the second participant from among the participants of the communication session.

11. The system of claim 10, wherein the operations further comprise:
    providing, for display at the device of the first participant, an indicator that indicates the selected participant.

12. The system of claim 10, wherein:
    the second participant has an assigned direction relative to the first participant; and
    determining that biometric information associated with the first participant indicates that the first participant is looking toward the first device comprises determining that the first participant is looking toward the assigned direction corresponding to the second participant.

13. One or more non-transitory machine-readable storage devices storing instructions that, when executed by one or more processors of one or more electronic devices, cause the one or more electronic devices to perform operations comprising:
    obtaining audio data or video data associated with a first participant of a communication session, wherein the communication session includes communication between a first device of the first participant with a second device of a second participant of the communication session;
    muting audio of the first participant such that the audio of the first participant is not transmitted to the second device of the second participant;

after muting the audio of the first participant, determining that biometric information associated with the first participant indicates that the first participant is looking toward the first device; and in response determining that the biometric information associated with the first participant indicates that the first participant is looking toward the first device, unmuting the audio of the first participant such that the audio of the first participant is transmitted to the second device of the second participant.

14. The one or more non-transitory machine-readable storage devices of claim 13, wherein the biometric information comprises eye tracking data for the first participant.

15. The one or more non-transitory machine-readable storage devices of claim 13, wherein the biometric information comprises head position data for the first participant.

16. The one or more non-transitory machine-readable storage devices of claim 13, wherein the communication session includes communication with a third device of a third participant of the communication session;

wherein determining that biometric information associated with the first participant indicates that the first participant is looking toward the first device comprises determining a direction of gaze of the first participant during the communication session;

wherein the operations comprise selecting, from among the participants of the communication session, the second participant based on the direction of the gaze of the first participant; and wherein the operations further comprise transmitting the audio data or the video data associated with the first participant to the second device of the second participant of the communication session based at least on selecting the second participant from among the participants of the communication session.

17. The one or more non-transitory machine-readable storage devices of claim 16, wherein the operations further comprise:

providing, for display at the device of the first participant, an indicator that indicates the selected participant.

* * * * *